(12) United States Patent
Osadchyy

(10) Patent No.: US 10,007,870 B2
(45) Date of Patent: Jun. 26, 2018

(54) REDIRECTION OF A FILE BASED ON DISTANCE BETWEEN PHYSICAL PORTS OF AN INTERMEDIATE DEVICE

(71) Applicant: KYOCERA Document Solutions Inc., Osaka (JP)

(72) Inventor: Oleksandr Osadchyy, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days. days.

(21) Appl. No.: 15/814,011

(22) Filed: Nov. 15, 2017

(65) Prior Publication Data
US 2018/0075326 A1 Mar. 15, 2018

Related U.S. Application Data

(63) Continuation of application No. 14/670,841, filed on Mar. 27, 2015.

(51) Int. Cl.
*G06K 15/02* (2006.01)
*G06F 3/12* (2006.01)

(52) U.S. Cl.
CPC ....... *G06K 15/1805* (2013.01); *G06F 3/1213* (2013.01); *G06F 3/1261* (2013.01); *G06F 3/1285* (2013.01); *G06F 3/1291* (2013.01); *G06K 15/1823* (2013.01); *G06F 3/121* (2013.01)

(58) Field of Classification Search
None
See application file for complete search history.

(56) References Cited

U.S. PATENT DOCUMENTS

| 6,359,879 | B1 * | 3/2002 | Carvey | H04L 45/04 370/351 |
|---|---|---|---|---|
| 7,698,396 | B2 | 4/2010 | Aoyagi et al. | |
| 8,543,681 | B2 | 9/2013 | Bearden et al. | |
| 8,564,813 | B2 | 10/2013 | Matsuyama | |

(Continued)

FOREIGN PATENT DOCUMENTS

| EP | 1672906 A2 | 6/2006 |
|---|---|---|
| WO | WO 2016091029 A1 * | 6/2016 |

OTHER PUBLICATIONS

Bergman, R. et al., Printer MIB v2, Standards Track, Network Working Group, RFC 3805, Jun. 2004 (171 pages).

(Continued)

*Primary Examiner* — Fan Zhang
(74) *Attorney, Agent, or Firm* — McDonnell Boehnen Hulbert & Berghoff LLP

(57) ABSTRACT

An example embodiment may involve a target device receiving a file that contains a job. The job may be associated with preferences that are not supported by the target device. In response, the target device may determine weighted ratings for candidate devices, where the weighted ratings are based on the inverse of the physical port distance along an outside of the network switch device. The physical port distance is between a respective pair of two physical ports on the network switch device in which cables are inserted to communicatively connect the target device to the respective candidate devices. The target device may transmit the file to the candidate device with the highest weighted rating.

20 Claims, 8 Drawing Sheets

(56) References Cited

U.S. PATENT DOCUMENTS

| | | |
|---|---|---|
| 8,756,305 B2 | 6/2014 | Hirose |
| 2003/0011805 A1 | 1/2003 | Yacoub |
| 2003/0090697 A1 | 5/2003 | Lester et al. |
| 2005/0213971 A1* | 9/2005 | Amemiya ............ H04J 14/0227 398/45 |
| 2006/0200571 A1 | 9/2006 | Backman |
| 2007/0146772 A1 | 6/2007 | Castellani |
| 2007/0233834 A1 | 10/2007 | Hattori et al. |
| 2008/0231886 A1 | 9/2008 | Wehner et al. |
| 2010/0115097 A1 | 5/2010 | Gnanasambandam et al. |
| 2013/0094423 A1 | 4/2013 | Wengrovitz et al. |
| 2013/0242745 A1* | 9/2013 | Umezuki ................ H04L 47/33 370/236 |
| 2014/0153400 A1 | 6/2014 | Lee et al. |
| 2015/0139208 A1 | 5/2015 | Chan et al. |
| 2015/0254248 A1 | 9/2015 | Burns et al. |
| 2015/0365353 A1 | 12/2015 | Nagase |
| 2017/0104834 A1* | 4/2017 | Huang .................... H04L 67/18 |

OTHER PUBLICATIONS

Decker, E. et al., Definitions of Managed Objects for Bridges, Network Working Group, RFC 1493, Jul. 1993 (34 pages).
How to Understand and Configure Your Network for IntraVUE, http://intravue.net/IntravueConfig-HowTo.html, accessed Feb. 25, 2015 (14 pages).

* cited by examiner

… (1)

REDIRECTION OF A FILE BASED ON DISTANCE BETWEEN PHYSICAL PORTS OF AN INTERMEDIATE DEVICE

CROSS-REFERENCE TO RELATED APPLICATION

This application is a continuation of and claims priority to U.S. patent application Ser. No. 14/670,841, filed Mar. 27, 2015, which is hereby incorporated by reference in its entirety.

BACKGROUND

In recent years, various types of printing devices have become popular for both business and consumer use. In addition to traditional black and white printers, color printers, scanners, copiers, fax machines, and other components are now common. Multi-function peripherals (MFPs), that support two or more of these operations, are also widely available. As these devices have grown more prevalent, they are being used for processing of more sophisticated and complicated documents. However, not all printing devices are equally suited for all print jobs.

SUMMARY

A first example embodiment may involve receiving a print job, where the print job is associated with one or more printing preferences. The first example embodiment may also involve determining to redirect the print job, and querying one or more network entities for printing capabilities of one or more candidate printing devices. The first example embodiment may further involve, possibly based on a comparison between the printing preferences and the printing capabilities of the one or more candidate printing devices, selecting one of the one or more candidate printing devices for redirection of the print job. The printing capabilities of the selected printing device may meet the printing preferences. The first example embodiment may additionally involve transmitting the print job to the selected printing device.

A second example embodiment may include a non-transitory, computer-readable storage medium, having stored thereon program instructions that, upon execution by a computing device, cause the computing device to perform operations in accordance with the first example embodiment.

A third example embodiment may include a computing device containing at least a processor and data storage. The data storage may include program instructions that, when executed by the processor, cause the computing device to perform operations in accordance with the first example embodiment.

A fourth example embodiment may include means for performing each of the operations of the first example embodiment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION OF THE DRAWINGS

Figure 1A:
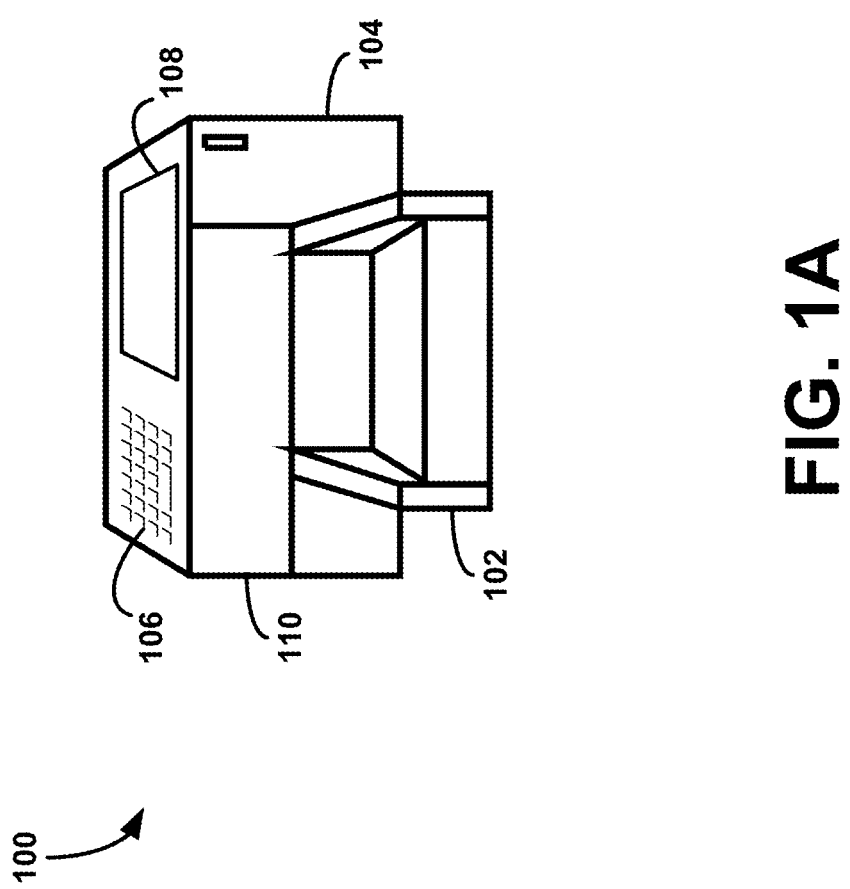
FIG. 1A depicts a printing device, according to example embodiments.

Example methods and systems are described herein. Other example embodiments or features may further be utilized, and other changes may be made, without departing from the scope of the subject matter presented herein. In the following detailed description, reference is made to the accompanying figures, which form a part thereof.

The example embodiments described herein are not meant to be limiting. Thus, aspects of the present disclosure, as generally described herein and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

1. Introduction

Printing technology has evolved over the last 30-plus years from simple dot-matrix-based output devices producing only black and white images to today's advanced laser-based printing devices that can produce high-resolution color images. Additionally, modern printing devices may also function as copiers, scanners, and fax machines. To do so, they may be able to store numerous electronic documents that are queued for printing or faxing, or that have been scanned. Thus, many printing devices are specialized forms of computing devices that may include, for example, one or more processors, data storage, and input/output interfaces.

In some environments, such as business and academic settings, an organization may have several dozen or more printing devices distributed throughout a building or campus. In addition to having various locations, these printing devices may have various capabilities. Some may be able to print in color, while others might only be able to print in black and white. Some may be able to sort, collate, and/or staple print jobs, while others might not. Some may be able to print on both sides of a piece of paper, and others may only be able to print on one side. Other examples of printing capabilities exist.

Users may be able to access printing devices from various locations. For instance, a user may be working at a computing device, such as a personal computer or a laptop computer, and may print an electronic document as a print job. During this process, the user may be able to select a target printing device and possibly some parameters for how the target printing device should process the print job. Often, the user will select a target printing device physically located near the user, so that the user can easily retrieve the print job. In some situations, however, the user may select a target printing device to ensure that the capabilities of the target printing device meet the preferences of the print job. For instance, when the user seeks to print the print job in color, the user may select a target printing device that supports color printing, even if the target printing device is not in the immediate proximity of the user.

Centralized print servers can be configured with the physical and/or topological locations of printing devices, as well as the capabilities of these printing devices. A user might submit a print job to the centralized server, and this server would either forward the print job to a specified printing device, or would select an appropriate printing device for the job. But, an ongoing trend in printing is decentralization. Today, users can print from various locations and from various devices.

As one example, cloud printing technology allows a user to access printing devices via the Internet or a private network no matter where the user and the printing devices are physically located. Through a cloud-printing account, the user selects a target printing device in one of various physical locations. The printing devices across these locations might not be able to be managed by a single print server.

As another example, an increasing number of printing devices are supporting Bluetooth technology. Bluetooth is a short-range wireless protocol that allows wireless computing devices (e.g., smartphones, tablet computers, laptops, etc.) to directly communicate with other nearby Bluetooth-enabled devices. Thus, a user who is carrying a tablet computer and wishes to print an electronic document from the tablet computer may be able to obtain a list of nearby Bluetooth-enabled printing devices, and select one of those devices.

Due to the decentralized nature of printing, decentralized print job routing may be beneficial, especially when print jobs are redirected from one printing device to another.

Reasons for this redirection may be numerous. In some cases, the selected target printing device may not be capable of meeting the preferences of the print job (e.g., the target printing device may be a black and white printer, but the print job requires a color printer). In other cases, the selected target printing device is capable of meeting the preferences of the print job, but cannot accept the print job for some reason. For example, the target printing device may be suffering from a paper jam, or may be out of toner, low on toner, or busy processing several other print jobs. In any of these cases, it may be advantageous for the target printing device to be able to redirect the print job to another printing device that is capable of processing the print job in the desired fashion.

The embodiments herein provide example procedures, printing devices, and systems for redirection of print jobs. In some embodiments, the redirection may advantageously occur in a distributed, serverless fashion, bypassing the need for a dedicated print server to which multiple printing devices are registered. The next section describes illustrative examples of such systems and devices.

2. Example Printing Device

FIG. 1A depicts an example printing device 100. Printing device 100 may be configured to print partially-stored and/or fully-stored electronic documents on various types of physical output media. These output media include, but are not limited to, various sizes and types of paper, overhead transparencies, and so on. Printing device 100 may be interchangeably referred to as a "printer."

Printing device 100 may serve as local peripheral to a computing device, such as a personal computer, a server device, a print server, etc. In these cases, printing device 100 may be attached to the computing device by cable, such as a serial port cable, parallel port cable, Universal Serial Bus (USB) cable, Firewire (IEEE 1394) cable, or High-Definition Multimedia Interface (HDMI) cable. Thus, the computing device may serve as a source of electronic documents for printing device 100.

On the other hand, printing device 100 may include a wireline or wireless network interface, such as an Ethernet or 802.11 (Wife) interface. So arranged, printing device 100 may serve as a printing device for any number of computing devices that can communicate with printing device 100 over a network. In some embodiments, printing device 100 may serve as both a local peripheral and a networked printer at the same time. In order to use printing device 100, computing devices may install one or more printer drivers. These printer drivers may include software components that convert the electronic documents to be printed from various local representations stored on the computing devices to one or more representations supported by printing device 100.

Regardless, printing device 100 may be considered to be a non-generic type of computing device, and may carry out both printing-related and non-printing related tasks. For instance, printing device 100 may also include copier, fax, and scanner functions. In some embodiments, printing device 100 may use a scanning unit to facilitate copier and/or fax functions. For instance, printing device 100 may scan a physical document into an electronic format, and then print the resulting electronic document to provide a copy, and/or transmit the resulting electronic document via a telephone interface to provide a fax operation. Additionally, printing device 100 may be able to receive a faxed electronic document via a telephone interface, and then compress and store a representation of this electronic document.

In order to support its various capabilities, printing device 100 may include a document feeder/output tray 102, paper storage 104, user interface 106, scanning element 108, and chassis 110. Nonetheless, printing devices may take on a wide variety of forms. Therefore printing device 100 may include more or fewer components than depicted in FIG. 1A, and/or components arranged in a different fashion than depicted in FIG. 1A.

Document feeder/output tray 102 may hold physical documents (e.g., a stack of one or more sheets of paper) that are to be scanned, copied or faxed. Advantageously, document feeder/output tray 102 may allow printing device 100 to automatically feed multiple physical documents for processing by printing device 100 without requiring manual intervention. Document feeder/output tray 102 may also include one or more separate output trays for holding physical documents that have been processed by printing device 100. These may include physical documents that have been scanned, copied or faxed by printing device 100, as well as physical documents that have been produced by, e.g., the fax and/or copying functions of printing device 100.

Paper storage 104 may include trays and/or feeding elements for various types of physical media. For instance, paper storage 104 may include separate trays for 8.5×11 inch paper, A4 paper, letterhead paper, envelopes, and so on. For any operation of printing device 100 that involves outputting physical media (e.g., printing, copying, and/or receiving a fax), paper storage 104 may supply the physical media.

User interface 106 may facilitate the interaction of printing device 100 with a human or non-human user, such as to receive input from a user and to provide output to the user. Thus, user interface 106 may include input components such as a keypad, keyboard, touch-sensitive or presence-sensitive panel, joystick, microphone, still camera and/or video camera. User interface 106 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. User interface 106 may also be configured to be able to generate audible output(s), via a speaker, speaker jack, audio output port, audio output device, earphones, and/or other similar devices, now known or later developed in the future.

Scanning element 108 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored in data storage associated with printing device 100.

Chassis 110 may include a physical housing that contains and/or interconnects various components of printing device 100, such as document feeder/output tray 102, paper storage 104, user interface 106, and scanning element 108. Additionally, chassis 110 may house other components not shown in FIG. 1A. For example, chassis 110 may contain one or more toner cartridges, liquid ink jets, belts, rollers, and/or power supplies. Further, chassis 110 may include communication interfaces, such as one or more wireline and/or wireless network interfaces, a telephony interface (e.g., a RJ45 jack), a USB interface, a BLUETOOTH® interface, a card reader port, etc.

Figure 1B:
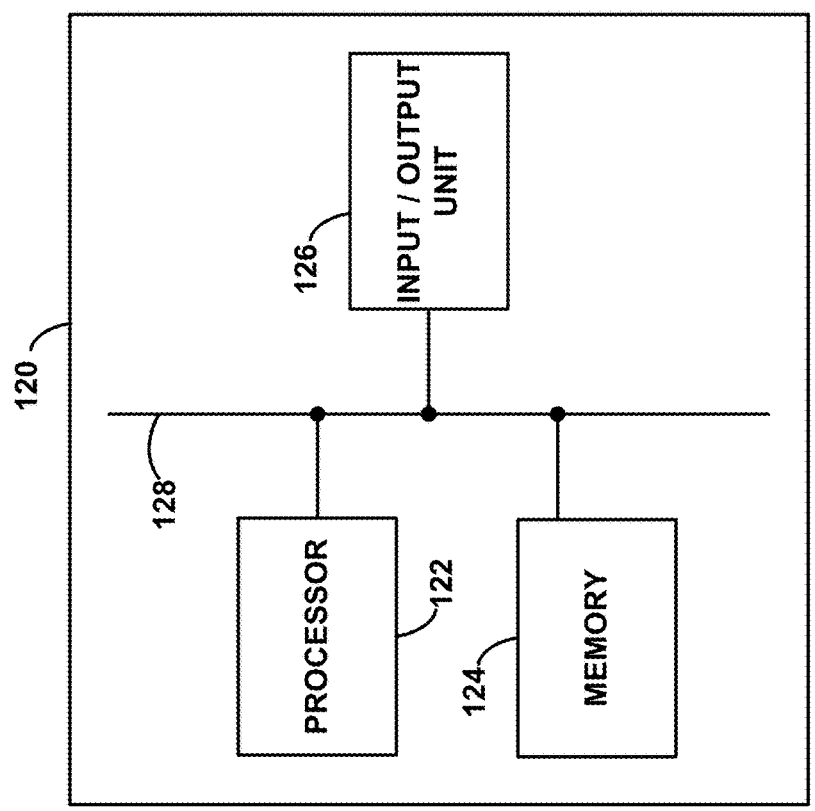
FIG. 1B is a block diagram illustrating computing components of a printing device, according to example embodiments.

Moreover, as printing device 100 may be based on general-purpose and/or specially-designed computing device components, chassis 110 may also house some or all of these components. To that point, FIG. 1B depicts an example embodiment 120 of computing device components (e.g., functional elements of a computing device) that may be included in printing device 100.

Computing device components 120 may include a processor 122, memory 124, and input/output unit 126, all of which may be coupled by a system bus 128 or a similar mechanism. Processor 122 may include one or more central processing units (CPUs), such as one or more general purpose processors and/or one or more dedicated processors (e.g., application specific integrated circuits (ASICs) or digital signal processors (DSPs), etc.).

Memory 124, in turn, may comprise volatile and/or non-volatile data storage and can be integrated in whole or in part with processor 122. Memory 124 may store program instructions, executable by processor 122, and data that are manipulated by these instructions to carry out the various methods, processes, or functions described herein. Alternatively, these methods, processes, or operations can be defined by hardware, firmware, and/or any combination of hardware, firmware and software. Therefore, memory 124 may include a tangible, non-transitory computer-readable medium, having stored thereon program instructions that, upon execution by one or more processors, cause printing device 100 to carry out any of the methods, processes, or functions disclosed in this specification or the accompanying drawings.

Memory 124 may also be configured to store compressed and non-compressed electronic documents that may later be processed (e.g., printed). Thus, memory 124 may serve as an output medium for these electronic documents.

Input/output unit 126 may include any of the operations and/or elements described in reference to user interface 126. Thus, input/output unit 126 may serve to configure and/or control the operation of processor 122. Input/output unit 126 may also provide output based on the operations performed by processor 122.

These examples of a printing device are provided for illustrative purposes. In addition to and/or alternatively to the examples above, other combinations and/or sub-combinations of printing and computer technologies may also exist, amongst other possibilities, without departing from the scope of the embodiments herein.

3. Example Print Job

Figure 2:
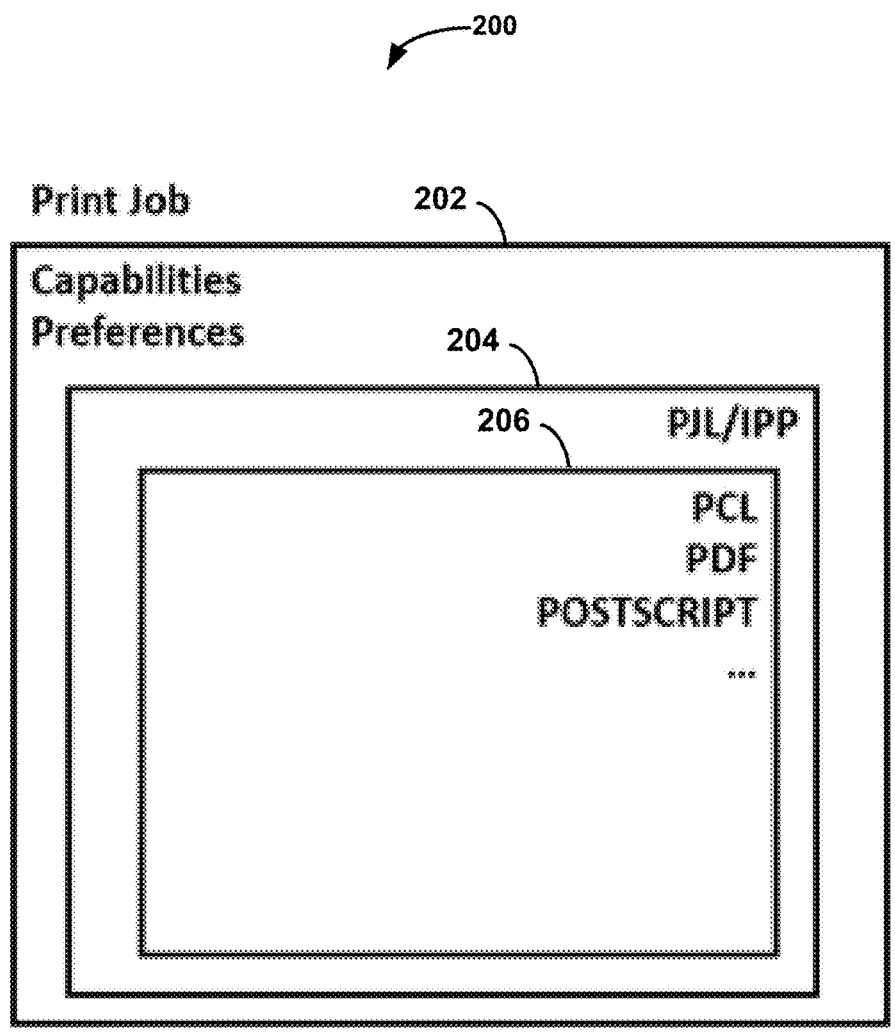
FIG. 2 is a block diagram depicting a print job, according to example embodiments.

FIG. 2 depicts an example print job 200. Print job 200 may include one or more text and/or binary formatted files. In some cases these files may be formatted in a standard fashion, but proprietary formats may be used as well.

Print job 200 may include metadata 202, which may include one or more sets of preferences and/or printer capabilities 202 requested by print job 200. For instance, preferences and/or capabilities 202 may include any of the preferences described herein, such as color printing, sorting, collating, stapling, two-sided printing, and so on. Print job 200 may also include one or more header(s) 204. These may be, for instance, Printer Job Language (PLJ) or Internet Printing Protocol (IPP) headers, or one or more other type of header.

Print job 200 may further include print data 206, which defines the text and images encoded by print job 200. Print data 206 may be arranged according to various formats, such as the Printer Command Language (PCL), Portable Document Format (PDF), PostScript (PS), the HyperText Markup Language (HTML), IPP, or some other format. Additional formats may be supported.

4. Example Network Topologies

Most modern local-area networks operate by using various forms of Ethernet or Wifi at the data-link layer and the Internet Protocol (IP) at the network layer. While other protocols can be used in other arrangements, use of these protocols will be assumed herein for purposes of example.

Each Ethernet and Wifi interface on a printing device or another type of computing device is assigned a 48-bit medium access control (MAC) address. MAC addresses are typically denoted using hexadecimal notation, with a colon between each pair of hexadecimal digits. For instance, 01:23:45:67:89:ab and 24:77:03:0f:4b:a7 are examples of MAC addresses. MAC addresses are assigned by the manufacturer of the interface or device, and typically do not change throughout the lifetime of this hardware. Thus, MAC addresses may be static.

MAC addresses facilitate communication of devices that share a specific link (e.g., an Ethernet or Wifi link). For example, if device A and device B are connected to one another on the same Ethernet network, device A may need to know the MAC address of device B in order to transmit packets to device B and vice versa. However, device A need not know the MAC addresses of devices on other networks (e.g., web servers on the Internet) in order to transmit packets to those devices.

IP addresses, on the other hand, are 32 bits long, and denoted using dotted-decimal notation, with a period between each 8-bit octet in the address, and each octet expressed as a decimal number between 0 and 255.

Examples of IP addresses include 192.168.0.1 and 128.153.4.3. While IP addresses can be statically configured, they often are assigned dynamically instead. Thus, an interface or device can be assigned many different IP addresses (typically not at the same time) throughout its lifetime.

IP addresses facilitate communication of devices regardless of these devices' physical or topological locations. For example, if device A and device C are connected to one another on the two different Ethernet networks linked by a bridge or router, each device may need to know each other's IP address, as well as a MAC address of the bridge or router, in order to communicate.

While devices know their own IP addresses and MAC addresses, they may not initially know the IP address or MAC address of other devices. In order to discover these addresses, various protocols may be used. Two such protocols are the Domain Name System (DNS) and the Address Resolution Protocol (ARP).

DNS is a hierarchical distributed database that maps human-friendly domain names to IP addresses. Thus, when a user or an application of a client device seeks to communicate with a particular Internet site, such as example.com, the user's client device transmits a request to its local DNS server. This request specifies the domain name and asks to be provided with the associated destination IP address. The DNS server may either directly respond to the request, providing the destination IP address, or may query one or more additional DNS servers until the destination IP address is found or the domain name is determined to be invalid.

Once the destination IP address is known, ARP may be used to determine a destination MAC address to physically transmit packets so that those packets eventually reach a device with that destination IP address. ARP is also a request-response protocol, and may work in two different ways.

By examining the destination IP address and comparing it to the IP address of the client device, the client device can determine whether the device with that destination IP address (the destination device) is on the same link as the client device. If this is the case, the client device may broadcast an ARP request on its local link, the ARP request specifying the destination IP address. Each recipient of the ARP request may examine the specified IP address and respond with its own MAC address if the recipient is assigned the specified IP address. Thus, the destination device may transmit an ARP response indicating that the destination IP address maps to a specific destination MAC address. With this information, the client device may transmit to this destination MAC address, in order to send packets to the destination device.

Alternatively, the destination device might not be on the same link as the destination device. For instance, the destination device may be on another network or somewhere on the Internet. In this case, the client device may seek to transmit a packet to the destination device via a local device that is capable of reaching the destination device. In addition to being configured with an IP address, an interface or device may also be configured with the IP address of a next-hop gateway device. The next-hop gateway device is typically a router that connects the client device to other networks. In order to reach those networks, and also reach the destination device, the client device may transmit packets to the next-hop gateway device. The next-hop gateway device, in turn, transmits these packets on to the destination device.

Therefore, in situations where the destination device is not on the same network as the client device, the client device may transmit an ARP packet specifying the IP address of the next-hop gateway device. The next-hop gateway device may transmit an ARP response indicating that the next-hop gateway IP address maps to a next-hop gateway MAC address. With this information, the client device may transmit packets to this MAC address, and the next-hop gateway device may forward these packets toward the destination device.

The examples given above describe just some possible arrangements, and other arrangements may exist. For instance, any device may be configured with more than one network interface (e.g., an Ethernet interface and a Wifi interface) and therefore may simultaneously use multiple MAC and IP address pairs, typically one per interface.

These techniques may be used in conjunction with the print job redirection embodiments described herein. However, on other types of networks, now known or developed in the future, different techniques may be employed.

5. Example Printing Device Selection for Redirected Jobs

Figure 3:
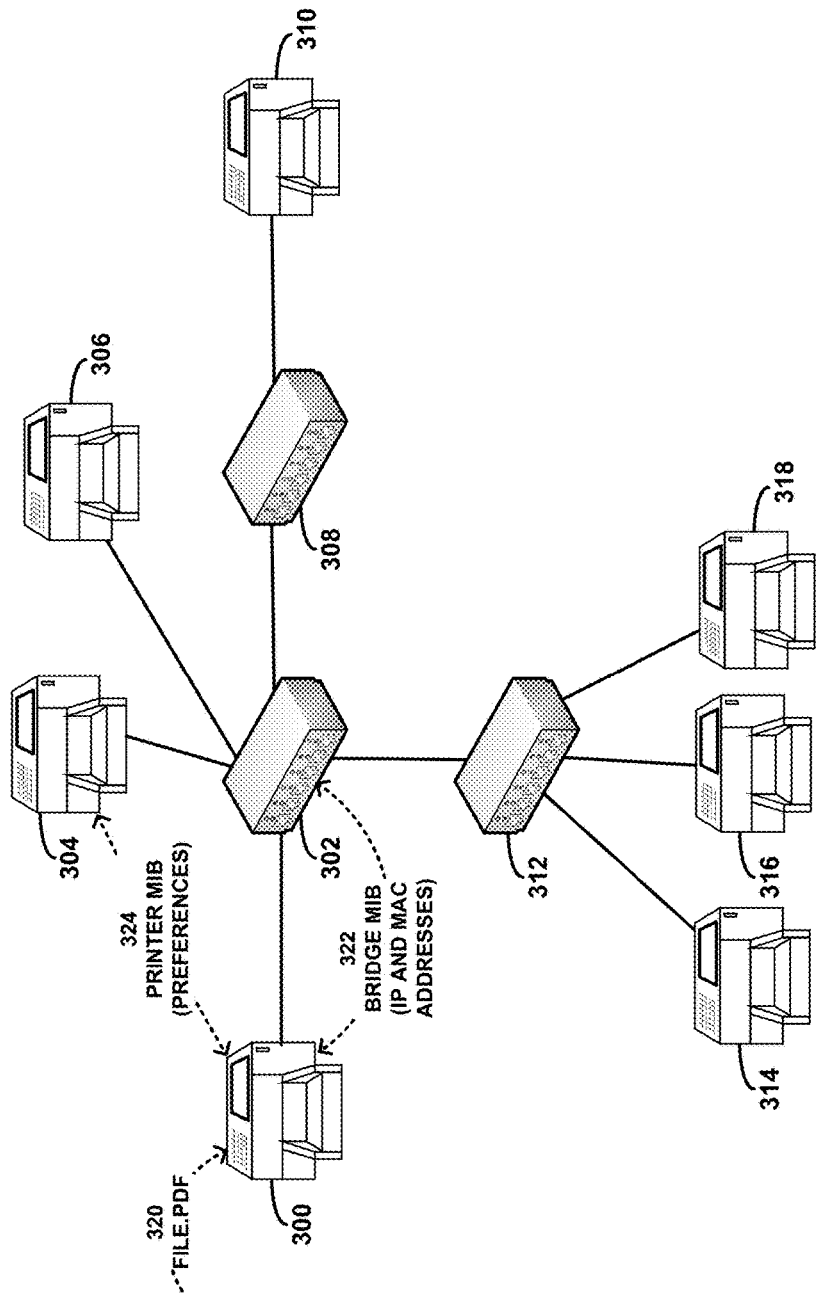
FIG. 3 is a network diagram, according to example embodiments.

FIG. 3 illustrates an example configuration of printing devices and switches, as well as communication between these printing devices and switches. Switches 302, 308, and 312 connect printing devices 300, 304, 306, 310, 314, 316, and 318. Each of these printing devices may have the same or similar capabilities as that of printing device 100. Printing devices 300, 304, and 306 are connected to switch 302, printing device 310 is connected to switch 308, and printing devices 314, 316, and 318 are connected to switch 312. Although FIG. 3 only depicts printing devices being connected to the switches, more devices, such as personal computers, tablet computers, server devices, wireless computing devices, and other types of devices may be connected as well. However, these additional devices are not shown for purposes of simplicity.

While the connections in FIG. 3 are depicted as wired links, any of these links may be replaced or enhanced with wireless links. Thus, any of the links shown in FIG. 3 may be, for example, Ethernet or Wifi. In FIG. 3, wired or wireless connections are depicted with solid lines, whereas example communication between the printing devices and switches are depicted with dotted lines.

For purposes of illustration, herein it will be assumed that printing device 300 is a target printing device. For instance, in communication 320, a print job may have been transmitted to printing device 300 from one of the computing devices connected to the network of FIG. 3. The print job may have one or more preferences. These preferences may include type of paper (e.g., letter, A4, bond, etc.), color or black-and-white printing, collation (when printing multiple copies of a print job, keeping the output of each copy together), and stapling. These preferences may also include factors regarding whether the target printing device can successfully complete the print job. Thus, for instance, the preferences may indicate that the target printing device should have at least a particular number of pages of the specified type of paper, and/or at least a particular amount of toner. Further, the printing preferences may include one or more operational statuses of the target printing device. Thus, the printing preferences may specify that the target printing device should be on-line, not in an error state, with a print queue of less than a certain number of print jobs or total pages, and so on.

As an example, a print job may specify that 5 copies of a 20-page electronic document are to be printed. The print job may further specify that the electronic document should be printed on a printing device that supports A4 paper, black-and-white printing, collation and stapling, has at least 100 pages of A4 paper in one of its document feeders, has enough black toner to print 100 pages, is on-line, not in an error state, and with a print queue of less than a total of 50 pages. Other examples of preferences exist.

As discussed above, if printing device 300 can meet the preferences of the print job, printing device 300 may print the print job. However, if this is not the case, printing device 300 may attempt to redirect the print job to another printing device that can successfully complete the print job. One way in which printing device 300 can determine an appropriate printing device for the redirection is to discover candidate printing devices in the topological vicinity of printing device 300, and redirect the print job to one of these candidate printing devices. If a print job is redirected, printing device 300 may notify the user and/or obtain the user's assent to this redirection.

In order to discover candidate printing devices, various protocols and techniques may be used. As an example, printing device 300 may employ the Simple Network Management Protocol (SNMP) to discover other printing devices in its topological vicinity. SNMP is a request/response protocol in which a client device requests to read or write to one or more managed objects on another device that supports an SNMP server. Many devices, such as switches, routers, and printing devices support SNMP server operations.

These devices may further support one or more SNMP Management Information Base (MIB) objects that provide access to data representing configuration, status and/or settings. For example, switches 302, 308, and 312 may support the SNMP bridge MIB, while printing devices 300, 304, 306, 310, 314, 316, and 318 may support the SNMP printer MIB. The bridge MIB includes various types of objects used by routers or switches that bridge two or more networks. Particularly, by way of the bridge MIB or other MIBs, each of switches 302, 308, and 312 may support a database containing pairs of MAC addresses and IP address of devices with which the respective switch has communicated. For instance, the bridge MIB of switch 302 may include entries associating the respective MAC addresses and IP addresses of printing devices 300, 304, and 306, as well as switches 308 and 312.

Printing device 300 may query the bridge MIB of switch 302. In response, switch 302 may transmit these associated MAC addresses and IP addresses to printing device 300. This procedure is depicted in communication 322.

In some cases, the bridge MIB of a switch or router might contain a list of MAC addresses of devices with which the respective switch has communicated, but no associated IP addresses of these devices. Thus, in response to its query, printing device 300 may receive the list of MAC addresses. In order to obtain the associated IP addresses, printing device may perform a Reverse ARP (RARP) for each of the MAC addresses.

A RARP transaction is the opposite of an ARP transaction. As noted above, an ARP transaction involves broadcasting a representation of an IP address in order to receive, from a device that is assigned the IP address, an indication of its associated MAC address. In contrast, a RARP transaction involves broadcasting a representation of a MAC address in order to receive, from a device that is assigned the MAC address, an indication of its associated IP address.

Therefore, if printing device 300 receives a list of MAC addresses without associated IP addresses from switch 302, printing device 300 may transmit RARP requests for each of these MAC addresses. In this way, printing device 300 may receive IP addresses associated with each of the MAC addresses (unless one or more devices assigned any of the MAC addresses do not respond to the RARP request for some reason).

Regardless of how printing device 300 obtains the IP addresses, printing device 300 may next determine which of these IP addresses is assigned to another printing device. One way of doing so is for printing device 300 to query each IP address to determine whether the device assigned that IP address supports the printer MIB. Devices that do not support the printer MIB are unlikely to be printing devices, while devices that do support the printer MIB are likely to be printing devices. For instance, communication 324 depicts printing device 300 querying the printer MIB of printing device 304, and receiving the preferences of printing device 304.

A printer MIB may contain representations of the features supported by a printing device, as well as representations of the status of the printing device. As an example, any of the preferences or operational statuses described above may be supported by a printer MIB. Thus, printing device 300 may query the printer MIB of printing devices that support this MIB, and from the information therein be able to determine whether each of the associated printing devices meet the preferences of a particular print job.

Figure 4:
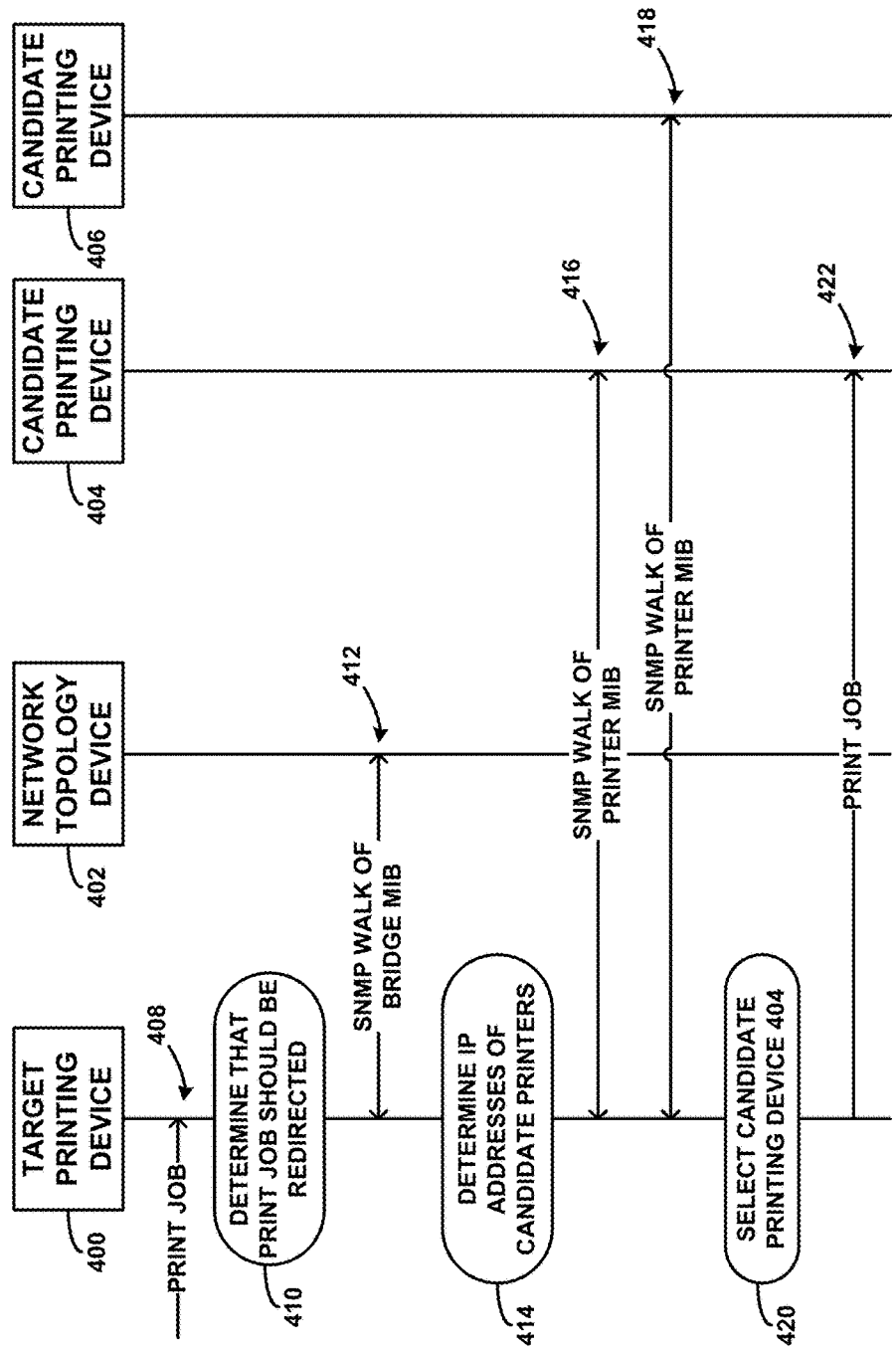
FIG. 4 is a message flow diagram, according to example embodiments.

FIG. 4 illustrates redirecting a print job from target printing device 400 to another printing device. Target printing device 400 may be an embodiment of printing device 100 and/or printing device 300. In FIG. 4, target printing device 400 may be connected to candidate printing device 404 and candidate printing device 406 by way of network topology device 402. Network topology device 402 may be a switch, router, or another type of device, and may support the bridge MIB. FIG. 4 serves as one possible embodiment of redirecting a print job from a target printing device to another printing device. Other embodiments may exist.

At step 408, target printing device 400 receives a print job. Target printing device 400 may receive the print job electronically via a network (e.g., from a personal computer printing a file) or by way or its user interface. For example, target printing device 400 may include a control panel and a document feeder. A user may place one or more documents in the document feeder and, via the control panel, select a number of copies and other printing preferences.

Regardless of how target printing device 400 obtains the print job, at step 410, target printing device 400 determines that the print job should be redirected. This determination may be the result of comparing the preferences of the print job to the capabilities and/or operational status of target printing device 400, and concluding that the capabilities do not support at least one of the preferences. As a possible example, target printing device 400 may compare the contents of its own printer MIB to the preferences of the print job. Alternatively or additionally, target printing device 400 may compare its own configuration (e.g., from a configuration file) and/or operational status to the preferences of the print job. If target printing device 400 determines that its capabilities and/or operational status cannot meet the preferences, target printing device may conclude that it should not handle the print job.

Consequently, at step 412, target printing device 400 may perform an SNMP walk of the bridge MIB of network topology device 402. An SNMP walk is a series of request/response transactions, in this case between target printing device 400 and network topology device 402, so that target printing device 400 can obtain a copy of the values in the bridge MIB of network topology device 402. As a result, target printing device 400 may obtain a list of MAC address assigned to devices topologically nearby target printing device 400 and network topology device 402.

At step 414, target printing device 400 may determine the IP addresses of candidate printing devices. These candidate printing devices may each be potential destinations to which target printing device 400 can redirect the print job. As noted above, there are various ways in which these IP addresses can be determined. For instance, the SNMP walk of the bridge MIB of network topology device 402 may provide only MAC addresses, and target printing device 400 may perform a series of RARP requests until it learns the IP addresses associated with at least some of these MAC addresses. Alternatively, the SNMP walk of the bridge MIB of network topology device 402 may provide IP addresses respectively associated with each of the MAC addresses.

Regardless of how the IP addresses are obtained, these IP addresses may be assigned to various types of devices, and not just printing devices. Therefore, target printing device 400 may attempt to identify which of these IP address are assigned to printing devices. For instance, target printing device 400 may attempt to perform an SNMP walk of the printer MIB for each device. If such an SNMP walk fails for a particular device, then that device is likely not a printing device.

Accordingly, at steps 416 and 418, target printing device 400 may perform SNMP walks of the printer MIB of candidate printing device 404 and candidate printing device 406, respectively. Not only do these operations identify candidate printing device 404 and candidate printing device 406 as printing devices, but they also allow target printing device 400 to obtain the capabilities and operational statuses of candidate printing device 404 and candidate printing device 406.

At step 420, target printing device 400 may compare the preferences of the print job to one or more of the obtained capabilities and operational status of the candidate printing devices. Based on the outcome of these comparisons, target printing device 400 selects candidate printing device 404, and at step 422, transmits the print job to candidate printing device 404.

As part of step 420, target printing device 400 may compare each preference to one or more associated capabilities to determine whether preferences can be met. Target printing device 400 may select the first candidate printing device that meets all of the preferences.

Alternatively, if one or more preferences cannot be met, target printing device 400 may continue searching for a candidate printing device that supports the preferences. For instance, from the list of associated MAC addresses and IP addresses obtained directly or indirectly from network topology device, target printing device 400 may attempt to determine which of these addresses are associated with other network topology devices. If additional network topology devices are discovered, target printing device 400 may repeat steps 412-420 for each of these devices. Thus, target printing device may recursively expand its search for candidate printing devices beyond those directly connected with network topology device 402.

Turning momentarily back to FIG. 3, printing device 300 may be a target printing device that has received a print job that it cannot print according to the print job's associated preferences. As such, printing device 300 may perform an SNMP walk of the bridge MIB of switch 302, and by way of that procedure, obtain IP addresses of printing devices 304 and 306. Printing device 300 may then perform an SNMP walk of the printer MIB of each of these two candidate printing devices, and then compare the capabilities of these candidate printing devices to the preferences of the print job.

If the capabilities of neither printing device meets the preferences of the print job, then printing device 300 may perform an SNMP walk of the bridge MIB of one or both of switches 308 and 312, and thereby eventually obtaining the IP addresses of printing devices 310, 314, 316, and 318. (Printing device 300 may become aware of switches 308 and 312 from the bridge MIB of switch 302, or by way of some other mechanism.) Printing device 300 may then perform an SNMP walk of the printer MIB of each of these four candidate printing devices, and then compare the capabilities of these candidate printing devices to the preferences of the print job. This recursive procedure may continue on to additional switches reachable by way of switches 308 and 312, until a candidate printing device that meets the preferences is found, or no more candidate printing devices are discovered.

Turning back to FIG. 4, target printing device 400 may determine that, in some cases, more than one candidate printing device meets the preferences of the print job. In these situations, target printing device 400 may select one of the candidate printing devices in various ways, including considering factors not directly related to the preferences of the print job.

For instance, target printing device 400 may consider a port distance on network topology device 402. Port distance may refer to the physical distance between two ports on a switch. As an example, an 8-port Ethernet switch may be configured with all 8 ports in a row. Thus, the first and second ports in this row have a port distance of 1, whereas the first and fourth ports have a port distance of 3. Each port may connect one or more devices (e.g., printing devices) to the switch. The devices connected by way of the ports may also be referred to as being a port distance apart from one another, based on the ports on the switch to which they connect. In the case of devices that connect to a switch that supports Wifi and/or Ethernet, two devices that connect by way of Wifi may be assumed to have a constant port distance (e.g., 1, 2, 3, etc.). If one device connects by way of Wifi and the other connects by way of wiring, the same or a different constant may be used.

Target printing device 400 may select a candidate printing device that has the smallest port distance with respect to target printing device 400. This preference for a small port distance is based on observations of how networks are typically configured. Devices that are physically closer to one another are often connected to closer ports on a switch. For instance, devices that are in two adjacent rooms of a building are frequently connected into neighboring ports on a switch, whereas devices that are in rooms that are more distant from one another may be connected into ports on the switch that are further apart. By selecting the candidate printing device that has the smallest port distance with target printing device 400, target printing device 400 may also be selecting a printing device that is physically nearby. In this way, the user who initially sent a print job to target printing device 400 might not have to go far in order to retrieve his or her print out if the print job is redirected. The numbering of ports on a switch may be determined from the switch's bridge MIB, other MIBs, or by other mechanisms.

In some situations, the new target printing device may produce a sound (e.g., a beeping sound) to help the user find it, if the new target printing device is within a particular proximity of the target printing device (e.g., less than 20 meters away, less than one room away, etc.). The target printing device may show a visual image on its panel of the new target printing device (e.g. an image automatically retrieved from a web-based image search engine searched by the model name of the new target printing device), or the target printing device may display a map with directions to the new target printing device.

Alternatively or additionally, target printing device 400 may consider roundtrip delays and/or hop distances between itself and each candidate printing device. In the case of roundtrip delays, target printing device 400 may measure these delays using a ping utility or another application capable of measuring network delay between two devices. Target printing device 400 may consider an inverse of each such measured delay when selecting candidate printing devices.

Figure 5:
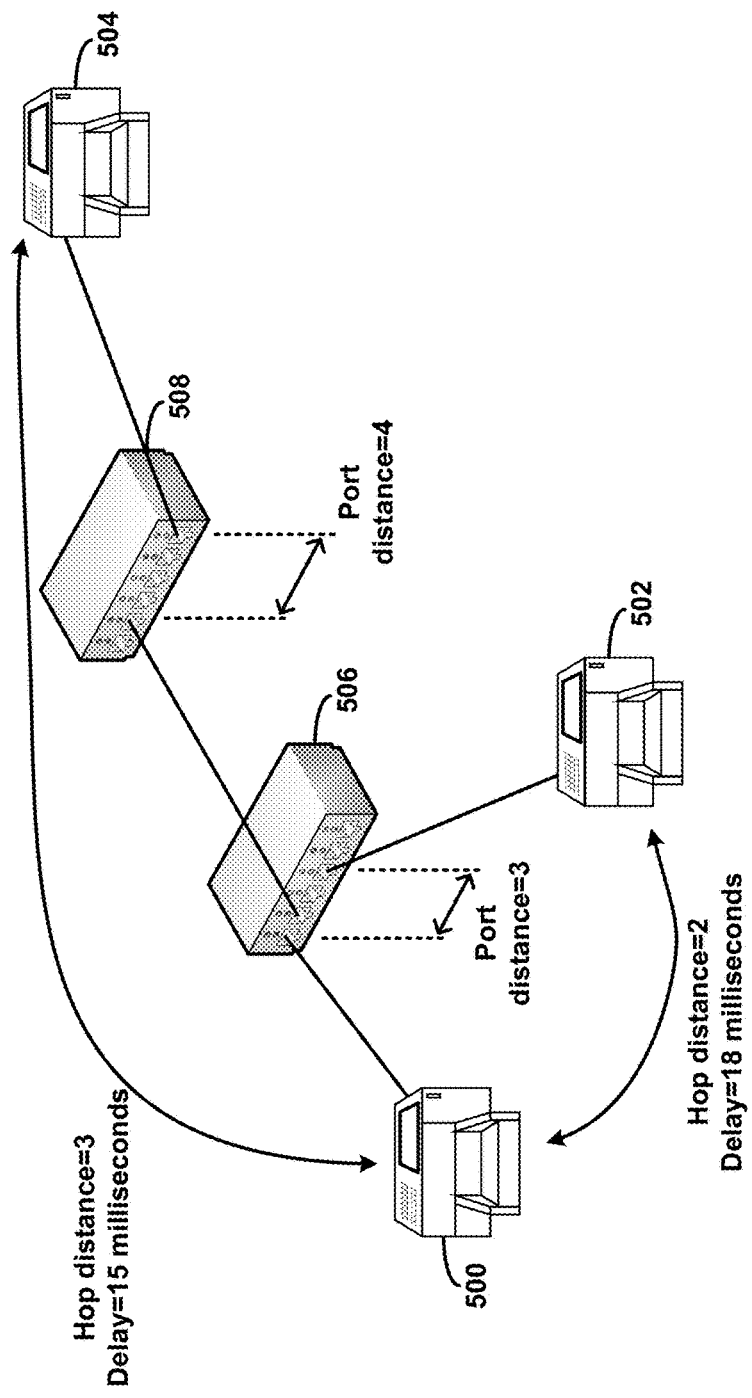
FIG. 5 is a network diagram, according to example embodiments.

FIG. 5 depicts an example network illustrating the measurement of port distance, delay, and hop distance. Printing devices 500, 502, and 504 are connected to one another by way of switches (or routers) 506 and 508. Printing device 500 may be a target printing device that is evaluating candidate printing devices for print job redirection.

As shown in FIG. 5, the hop distance between printing devices 500 and 502 is 2 (one hop from printing device 500 to switch 506, and another hop from switch 506 to printing device 502). Also, the delay between these printing devices has been measured to be 18 milliseconds. As both printing devices are connected to switch 506, their port distance is 3, because they are plugged into respective ports that are three ports apart from one another.

The hop distance between printing devices 500 and 504 is 3 (one hop from printing device 500 to switch 506, and another hop from switch 506 to switch 508, and yet another hop from switch 508 to printing device 504). Further, the delay between these printing devices has been measured to be 15 milliseconds. As both printing devices are connected by way of switch 506, their port distance is 1, because they are plugged into respective ports that are one port apart from one another. However, both printing devices are also connected by way of switch 508, so their port distance may be considered to be 4 instead. In some cases, the sum or average of these two port distances may be used, or port distance may be ignored when printing devices are more than two hops away from one another.

Turning back to FIG. 4, suppose that target printing device 400 measured the average delay between itself and candidate printing device 404 to be 10 milliseconds, and the average delay between itself and candidate printing device 406 to be 20 milliseconds. The inverse of these measurements are $\frac{1}{10}=0.1$ and $\frac{1}{20}=0.05$, respectively. Target printing device 400 may select the candidate printing device with the highest inverse—in this case candidate printing device 404—reflecting a preference for candidate printing devices with lower average delays as measured by target printing device 400.

Moreover, target printing device 400 may measure hop distances between itself and each candidate printing device using a traceroute utility or another application capable of measuring hop distance between two devices. A hop distance between a client device and a destination device may be defined as the number of devices that packets traverse on their way to a destination device, including the destination device. Target printing device 400 may consider an inverse of each such measured hop distance when selecting candidate printing devices.

For instance, suppose that target printing device 400 measured the hop distance between itself and candidate printing device 404 to be 2 hops, and the hop distance between itself and candidate printing device 406 to be 4 hops. The inverse of these measurements are $\frac{1}{2}=0.5$ and $\frac{1}{4}=0.25$, respectively. Target printing device 400 may select the candidate printing device with the highest inverse—in this case candidate printing device 404—reflecting a preference for candidate printing devices that are topologically closer to target printing device 400.

In some embodiments, a target printing device may select a candidate printing device based on a weighting of both measured delay and hop distance. For example, the target printing device may calculate:

$$R_i = \alpha_i\left(w_1 \frac{1}{d_i} + w_2 \frac{1}{h_i}\right)$$

where $a_i$, $w_1$, and $w_2$ are weights, $d_i$ is the average delay from the target printing device to candidate printing device i, and $h_i$ is the hop distance from target printing device to candidate printing device i. The target printing device may select the candidate printing device with the highest value of rating $R_i$. In some embodiments, the inverse of the port distance between where the target printing device and the candidate printing device connect to a switch may be considered as well. For example, the formula $$R_i = \alpha_i\left(w_1 \frac{1}{d_i} + w_2 \frac{1}{h_i} + w_3 \frac{1}{p_i}\right)$$

may be used, where $w_3$ is another weight, and $p_i$ is the port distance between the two devices.

In some embodiments, weight $a_i$ may be initiated at a particular value (e.g., 1) and increased (e.g., by 0.1, 0.2, 0.5, 1.0) each time candidate printing device i is selected for redirection, and decreased (e.g., by 0.1, 0.2, 0.5, 1.0) each time candidate printing device i is not selected for redirection.

TABLE 1

| Printer | MAC addr | IP addr | $\alpha_i$ | $d_i$ | $h_i$ | $p_i$ | $R_i$ | Counter |
|---|---|---|---|---|---|---|---|---|
| 1 | 01:23:45:67:89:ab | 192.168.0.1 | 1 | 10 | 3 | 2 | 0.85 | 0 |
| 2 | 24:77:03:0f:4b:a7 | 128.153.4.3 | 1.2 | 5 | 1 | 3 | 2.36 | 1 |

Table 1 provides an example weighting of two printers, where $w_1=1$, $w_2=1.5$, and $w_3=0.5$. The "Counter" column represents the number of times a user has selected the associated candidate printing device. For instance, in Table 1, the candidate printing device with the MAC address of 24:77:03:0f:4b:a7 may have begun with an $a_2$ value of 1, and after being selected once, this value may have increased to 1.2.

Nonetheless, filling out these equations results in the following totals:

$$R_1 = 1(\tfrac{1}{10} + 1.5\tfrac{1}{3} + 0.5\tfrac{1}{2}) = 0.85$$

and $$R_2 = 1.2(1\tfrac{1}{5} + 1.5\tfrac{1}{1} + 0.5\tfrac{1}{3}) = 2.36$$

Other formulas may be used to calculate rating $R_i$. Some of these formulas, for instance, may be based on a multiplicative relationship between $d_i$, $h_i$, and $p_i$. Other formulas may be based on only one of $d_i$, $h_i$, and $p_i$. In some cases, weights $w_1$, $w_2$, and $w_3$ may vary per candidate printing device.

In some cases, the print job's preferences may permit the target printing device to start printing the printing job, but have another printing device finish the print job. For example, if the target printing device prints 70 pages of a 100-page print job, the target printing device may follow procedures set forth herein to select a printing device, and then redirect the remaining part of the print job to the selected printing device. Accordingly, the selected printing device may print the remaining 30 pages of the print job.

6. Example Operations

Figure 6:
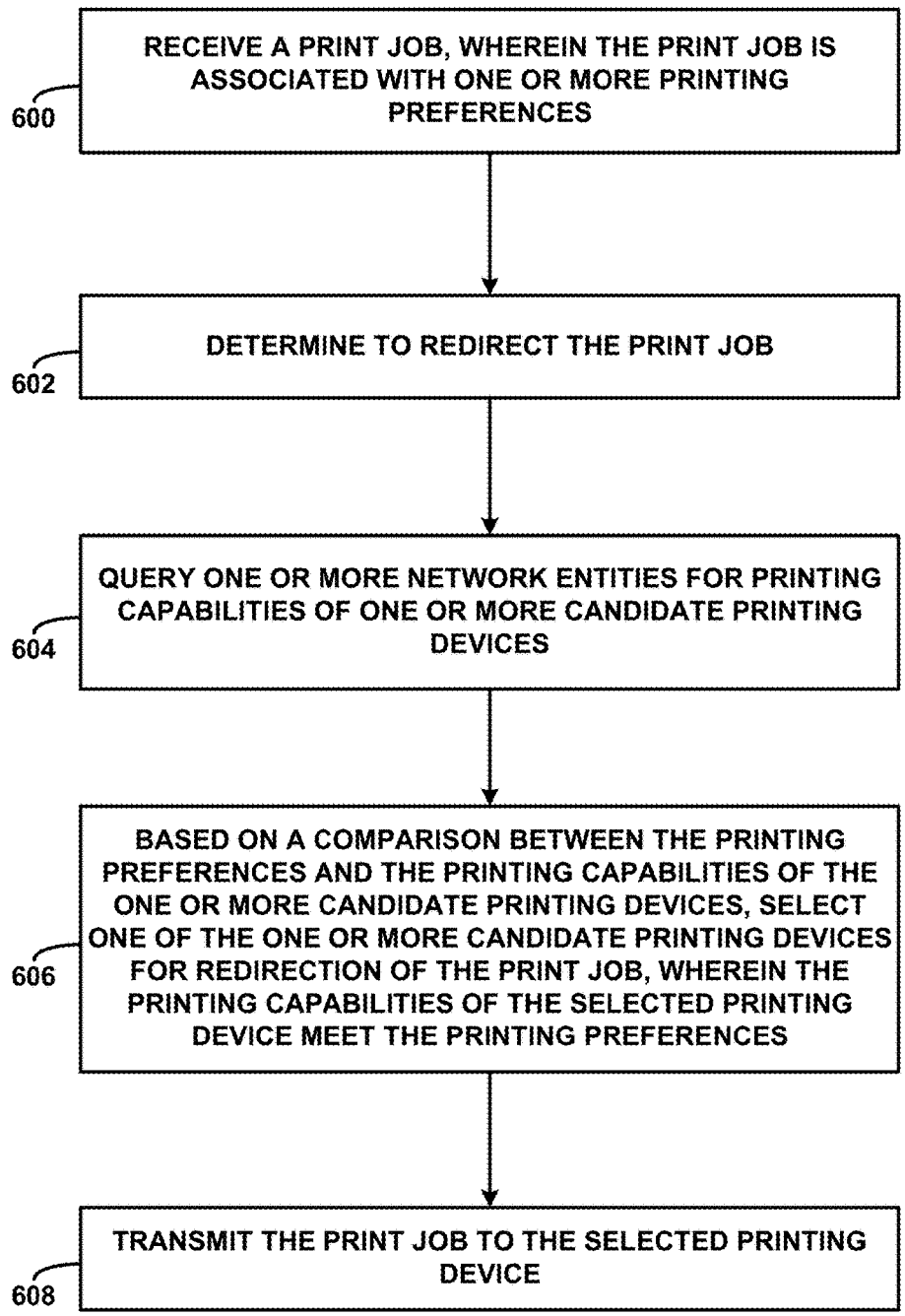
FIG. 6 is a flow chart, according to example embodiments.

FIG. 6 is a flow chart of an example embodiment. The steps illustrated by this flow chart may be carried out by one or more printing devices, such as printing device 100, and/or other computing devices. Further, aspects of each individual step may be distributed between multiple computing or printing devices.

Step 600 may involve a target printing device receiving a print job. The print job may be associated with one or more printing preferences. Step 602 may involve determining to redirect the print job. Step 604 may involve querying one or more network entities for printing capabilities of one or more candidate printing devices.

Step 606 may involve, possibly based on a comparison between the printing preferences and the printing capabilities of the one or more candidate printing devices, selecting one of the one or more candidate printing devices for redirection of the print job. The printing capabilities of the selected printing device may meet the printing preferences. Step 608 may involve the target printing device transmitting the print job to the selected printing device.

In some embodiments, the printing preferences may include at least one of a black-and-white or color preference, a page count preference, a toner capacity preference, or a stapling preference. Alternatively or additionally, the printing capabilities of the one or more candidate printing devices may include respective operational statuses of the one or more candidate printing devices.

In some embodiments, determining to redirect the print job may involve (i) comparing the printing preferences to printing capabilities of the target printing device, and (ii) determining that at least one of the printing preferences cannot be met by the printing capabilities of the target printing device.

Figure 7:
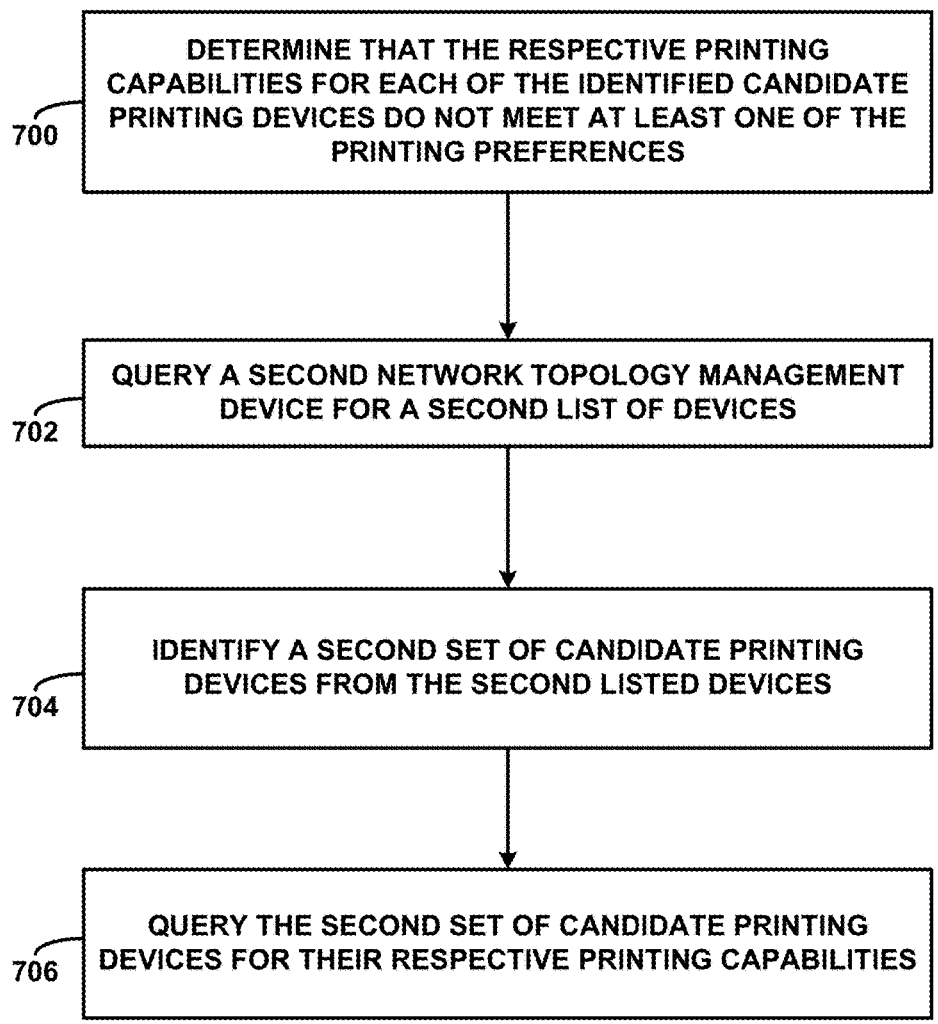
FIG. 7 is another flow chart, according to example embodiments.

In some embodiments, querying the one or more network entities for the printing capabilities of the one or more candidate printing devices may involve (i) querying a network topology management device for a list of devices, (ii) identifying a set of candidate printing devices from the listed devices, and (iii) querying the set of candidate printing devices for their respective printing capabilities. This querying may further involve the steps depicted in FIG. 7. For example, step 700 may involve determining that the respective printing capabilities for each of the identified candidate printing devices do not meet at least one of the printing preferences. Step 702 may involve querying a second network topology management device for a second list of devices. Step 704 may involve identifying a second set of candidate printing devices from the second listed devices. Step 706 may involve querying the second set of candidate printing devices for their respective printing capabilities.

In some embodiments, the network topology management device is a network switch device. Querying the network topology management device for the list of devices may involve performing an SNMP walk on a bridge MIB of the network switch device to discover addresses of the set of candidate printing devices. Querying the set of candidate printing devices for their respective printing capabilities may involve performing an SNMP walk of printer MIBs of each of the set of candidate printing devices.

In some embodiments, selecting one of the one or more candidate printing devices for redirection of the print job may involve (i) determining respective weighted ratings for two or more candidate printing devices with printing capabilities that meet the printing preferences, and (ii) selecting one of the two or more candidate printing devices with the highest weighted rating. The weighted ratings may be based on (i) respective observed response times of the two or more candidate printing devices, and/or (ii) respective topological distances between the target printing device and each of the two or more candidate printing devices. A weight of the weighted rating for the selected printing device may be increased after being selected.

In some embodiments, selecting one of the one or more candidate printing devices for redirection of the print job may involve (i) displaying, on a user interface, information related to at least some of the candidate printing devices with printing capabilities that meet the printing preferences, and (ii) receiving, from the user interface, an indication of the selected printing device.

In some embodiments, the redirection may occur after at least one page of the print job has printed at the target printing device. In these cases, the target printing device may print part of the print job, and the selected candidate printing device may print another part of the print job.

7. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for redirecting a file between printing devices, the method comprising:
   receiving, by a target printing device, the file containing at least part of a print job, wherein the print job is associated with one or more printing preferences;
   based on the printing preferences or a state of the target printing device, querying, by the target printing device, a network switch device for a list of IP addresses of devices reachable by way of the network switch device;
   querying, by the target printing device, the devices that use the IP addresses to identify a subset thereof that support a printer management information base (MIB), wherein the subset of the devices are candidate printing devices reachable by way of the network switch device;
   obtaining, by the target printing device, respective printing capabilities of each candidate printing device;
   determining, by the target printing device, a first candidate printing device and a second candidate printing device of the candidate printing devices, wherein the printing capabilities of the first candidate printing device and the second candidate printing device match the printing preferences of the print job;
   determining, by the target printing device, a first weighted rating for the first candidate printing device, wherein the first weighted rating is based on a first inverse of a first physical port distance along an outside of the network switch device, wherein the first physical port distance is between a first pair of two physical ports on the network switch device in which cables are inserted to communicatively connect the target printing device to the first candidate printing device;
   determining, by the target printing device, a second weighted rating for the second candidate printing device, wherein the second weighted rating is based on a second inverse of a second physical port distance along an outside of the network switch device, wherein the second physical port distance is between a second pair of two physical ports on the network switch device in which cables are inserted to communicatively connect the target printing device to the second candidate printing device;
   selecting, by the target printing device, a printing device with the highest weighted rating from the first candidate printing device and the second candidate printing device; and
   transmitting, by the target printing device, the file to the selected printing device.

2. The method of claim 1, wherein the printing preferences include at least one of a black-and-white or color preference, a page count preference, a toner capacity preference, or a stapling preference.

3. The method of claim 1, further comprising:
   comparing the printing preferences to printing capabilities of the target printing device; and
   determining that at least one of the printing preferences cannot be met by the printing capabilities of the target printing device.

4. The method of claim 1, wherein querying the network switch device for the list of IP addresses of devices reachable by way of the network switch device comprises:
   performing a Simple Network Management Protocol (SNMP) walk on a bridge MIB of the network switch device to discover the list of IP addresses.

5. The method of claim 1, wherein querying the devices that use the IP addresses to identify the subset thereof that support the printer MIB comprises:
   performing an SNMP walk of MIBs of each of the candidate printing devices to determine support of the printer MIB.

6. The method of claim 1, wherein the first weighted rating is also based on a first measured roundtrip delay between the target printing device and the first candidate printing device, and wherein the second weighted rating is also based on a second measured roundtrip delay between the target printing device and the second candidate printing device.

7. The method of claim 1, wherein the first weighted rating is also based on a first topological network hop distance between the target printing device and the first candidate printing device, and wherein the second weighted rating is also based on a second topological network hop distance between the target printing device and the second candidate printing device.

8. The method of claim 1, wherein a weight of the weighted rating for the selected printing device is increased after being selected.

9. The method of claim 1, wherein transmitting the file to the selected printing device occurs after at least one page of the print job has printed at the target printing device.

10. The method of claim 1, wherein the state of the target printing device indicates whether the target printing device is subject to a paper jam, out of toner, low on toner, or busy processing one or more other print jobs.

11. An article of manufacture including a non-transitory computer-readable medium, having stored thereon program instructions that, upon execution by a target printing device, cause the target printing device to perform operations comprising:
   receiving a file containing at least part of a print job, wherein the print job is associated with one or more printing preferences;
   based on the printing preferences or a state of the target printing device, querying a network switch device for a list of IP addresses of devices reachable by way of the network switch device;
   querying the devices that use the IP addresses to identify a subset thereof that support a printer management information base (MIB), wherein the subset of the devices are candidate printing devices reachable by way of the network switch device;

obtaining respective printing capabilities of each candidate printing device;

determining a first candidate printing device and a second candidate printing device of the candidate printing devices, wherein the printing capabilities of the first candidate printing device and the second candidate printing device match the printing preferences of the print job;

determining a first weighted rating for the first candidate printing device, wherein the first weighted rating is based on a first inverse of a first physical port distance along an outside of the network switch device, wherein the first physical port distance is between a first pair of two physical ports on the network switch device in which cables are inserted to communicatively connect the target printing device to the first candidate printing device;

determining a second weighted rating for the second candidate printing device, wherein the second weighted rating is based on a second inverse of a second physical port distance along an outside of the network switch device, wherein the second physical port distance is between a second pair of two physical ports on the network switch device in which cables are inserted to communicatively connect the target printing device to the second candidate printing device;

selecting a printing device with the highest weighted rating from the first candidate printing device and the second candidate printing device; and transmitting the file to the selected printing device.

12. The article of manufacture of claim 11, wherein the first weighted rating is also based on a first measured roundtrip delay between the target printing device and the first candidate printing device, and wherein the second weighted rating is also based on a second measured roundtrip delay between the target printing device and the second candidate printing device.

13. The article of manufacture of claim 11, wherein the first weighted rating is also based on a first topological network hop distance between the target printing device and the first candidate printing device, and wherein the second weighted rating is also based on a second topological network hop distance between the target printing device and the second candidate printing device.

14. The article of manufacture of claim 11, wherein a weight of the weighted rating for the selected printing device is increased after being selected.

15. The article of manufacture of claim 11, wherein transmitting the file to the selected printing device occurs after at least one page of the print job has printed at the target printing device.

16. A target printing device comprising:
at least one processor;
memory; and
program instructions, stored in the memory, that upon execution by the at least one processor cause the target printing device to perform operations comprising:
receiving a file containing at least part of a print job, wherein the print job is associated with one or more printing preferences;

based on the printing preferences or a state of the target printing device, querying a network switch device for a list of IP addresses of devices reachable by way of the network switch device;

querying the devices that use the IP addresses to identify a subset thereof that support a printer management information base (MIB), wherein the subset of the devices are candidate printing devices reachable by way of the network switch device;

obtaining respective printing capabilities of each candidate printing device;

determining a first candidate printing device and a second candidate printing device of the candidate printing devices, wherein the printing capabilities of the first candidate printing device and the second candidate printing device match the printing preferences of the print job;

determining a first weighted rating for the first candidate printing device, wherein the first weighted rating is based on a first inverse of a first physical port distance along an outside of the network switch device, wherein the first physical port distance is between a first pair of two physical ports on the network switch device in which cables are inserted to communicatively connect the target printing device to the first candidate printing device;

determining a second weighted rating for the second candidate printing device, wherein the second weighted rating is based on a second inverse of a second physical port distance along an outside of the network switch device, wherein the second physical port distance is between a second pair of two physical ports on the network switch device in which cables are inserted to communicatively connect the target printing device to the second candidate printing device;

selecting a printing device with the highest weighted rating from the first candidate printing device and the second candidate printing device; and transmitting the file to the selected printing device.

17. The target printing device of claim 16, wherein the first weighted rating is also based on a first measured roundtrip delay between the target printing device and the first candidate printing device, and wherein the second weighted rating is also based on a second measured roundtrip delay between the target printing device and the second candidate printing device.

18. The target printing device of claim 16, wherein the first weighted rating is also based on a first topological network hop distance between the target printing device and the first candidate printing device, and wherein the second weighted rating is also based on a second topological network hop distance between the target printing device and the second candidate printing device.

19. The target printing device of claim 16, wherein a weight of the weighted rating for the selected printing device is increased after being selected.

20. The target printing device of claim 16, wherein transmitting the file to the selected printing device occurs after at least one page of the print job has printed at the target printing device.

* * * * *